United States Patent [19]

Kurzweil et al.

[11] Patent Number: 5,550,706
[45] Date of Patent: Aug. 27, 1996

[54] ELECTRODE WITH A LONG-TIME STABILITY AND A DOUBLE-LAYER CAPACITOR FORMED THEREOF

[75] Inventors: Peter Kurzweil; Barbara Schmid, both of Immenstaad; Ottmar Schmid, Markdorf, all of Germany

[73] Assignee: Dornier GmbH, Friedrichshafen, Germany

[21] Appl. No.: 269,117

[22] Filed: Jun. 30, 1994

[51] Int. Cl.$^6$ .............................. H01G 9/00; C25B 11/04
[52] U.S. Cl. ..................... 361/502; 361/504; 361/508; 361/516; 361/525; 361/528; 361/532; 361/517; 361/535; 204/280; 204/291
[58] Field of Search ..................... 361/502–505, 361/508, 516–517, 523, 525, 528, 532, 522, 535, 541; 204/280, 290 R, 290 F, 291–292

[56] References Cited

U.S. PATENT DOCUMENTS

4,758,929  7/1988  Naitoh et al. .
5,079,674  1/1992  Malaspina .

*Primary Examiner*—Bot L. Ledynh
*Attorney, Agent, or Firm*—Evenson, McKeown, Edwards & Lenahan, P.L.L.C.

[57] ABSTRACT

A double-layer capacitor unit includes two electrodes as well as one electrolyte arranged between the electrodes. The electrodes each comprise an active layer made of metal oxide powder on a chemically stable metal carrier. The electrolyte is a diluted aqueous mineral acid or alkaline lye.

14 Claims, 6 Drawing Sheets

| | RESISTANCE | | | CAPACITANCE | | | | ACTIVE MASS |
|---|---|---|---|---|---|---|---|---|
| | $R \cdot A$ $\overline{\Omega cm^2}$ | $R_1 kHz$ $\overline{\Omega cm}$ | $R_1 Hz$ $\overline{\Omega cm}$ | $C_1 kHz/A$ $\overline{mF/cm^2}$ | $C_1 Hz/A$ $\overline{mF/cm^2}$ | $C_1 kHz/m$ $\overline{F/g}$ | $C_1 Hz/m$ $\overline{F/g}$ | $m/A$ $\overline{mg/cm^2}$ |
| ACIDIC TECHNIQUE (EXAMPLE 1-6) | 0.01-0.3 | 0.2-7 | 4-80 | 21-150 | 80-3000 | 0.2-18 | 1.6-100 | 3-20 |
| ALKALINE TECHNIQUE (EXAMPLE 1-4) (EXAMPLE 7) | 0.1-0.3 0.3-2.6 | 1.9-2.5 1-20 | 10-50 5-25 | 2-30 4-100 | 25-1100 160-4000 | 0.8-2 0.2-3 | bis 31 10-150 | 0.4-10 1-9 |

ELECTRODE WITH A LONG-TIME STABILITY AND A DOUBLE-LAYER CAPACITOR FORMED THEREOF

BACKGROUND AND SUMMARY OF THE INVENTION

This invention relates to an electrode with a long-time stability and a double-layer capacitor formed thereof.

A double-layer capacitor comprises selected electron conductors and ion conductors. The ability to store energy is caused by the capacitance of the interface between the electron conductors and the ion conductors.

In principle, two highly conductive electrodes, coated with an electroactive layer of a high capacitance, dip into a highly conductive electrolyte. When an outside voltage U is fed between the electrodes, the electrochemical capacitor is charged by the fed energy W which is half of the product of the capacitance and of the difference of squares of charge and discharge voltages $U_1$, $U_2$:

$$W = \tfrac{1}{2}C(U_1^2 - U_2^2) = 1/2 CU_1^2(1-\alpha) = \tfrac{1}{2}QU_1^2(1-\alpha^2)$$

$$W = \tfrac{1}{2}C(U_1^2 - U_2^2) = 1/2 CU_1^2(1-\alpha) = \tfrac{1}{2}QU_1^2(1-\alpha^2)$$

wherein $\alpha$ is the fraction of the fed voltage which remains in the capacitor.

When the internal resistance of the capacitor $R_i$ against the external resistance of the consuming device $R_v$ is not negligible, this further reduces the usable energy by the ratio $R_v/(R_v+R_i)$.

The pseudocapacitance C of the electrode/electrolyte interface is composed of the proportion of the double-layer capacitance and the capacitive effects of electrochemical redox operations and adsorption processes.

Figure 1:
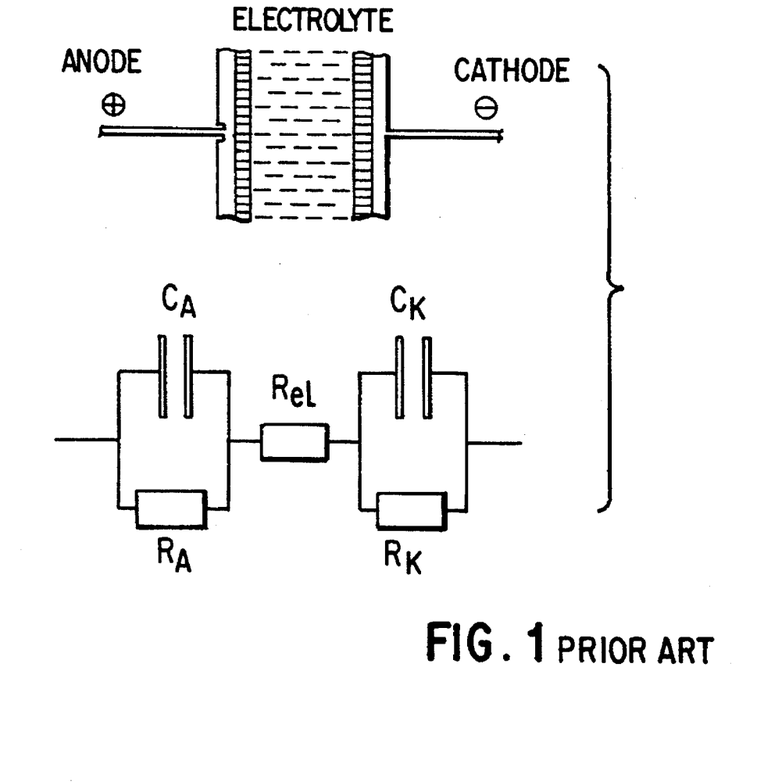
FIG. 1 illustrates the basic structure and an equivalent circuit diagram for a prior art double-layer capacitor.

FIG. 1 shows the basic structure and the electrotechnical equivalent circuit diagram of the double-layer capacitor. Each electrode is assigned to a parallel connection of a polarization resistance ($R_A$ or $R_K$) and a capacitance ($C_A$ or $C_K$). An ion conductor with the electrolyte resistance $R_{el}$ is situated between the electrodes. Together, the anode, the cathode and the electrolyte cause the measurable capacitance of the double-layer capacitor.

An electrochemical capacitor comprises at least two series-connected electrodes and thus at least two capacitive electrode/electrolyte interfaces. The cell capacitance is half as large as the capacitance of the individual electrode. However, the stored energy, since it is determined by the cell voltage, is twice that of the individual interfaces.

It has heretofore been known to use accumulators for storing electrical energy. However, the accumulators cannot be charged and discharged with any arbitrary frequency and, in addition, they can be only very slowly charged and discharged. In contrast, the double-layer capacitor can be cyclized with a frequency that is higher by orders of magnitude. In contrast to the commercially available electrolytic capacitor, the double-layer capacitor has a much higher specific capacitance and is therefore capable of storing higher amounts of energy per unit of volume and unit of mass. In a manner different than in the fixed-oxide dielectric of the electrolyte capacitor, in the case of the double-layer capacitor, electric energy is stored in the electrochemical double layer on the fixed-electrode/liquid-electrolyte interface. Additional advantages of the double-layer capacitor are: high energy and power density, high volumetric efficiency, maintenance-free operation, harmlessness in the inoperative state.

Materials on a base of conductive polymers function only at low currents and exhibit problems with respect to long-time stability. Carbon systems exhibit high resistances and poor efficiency. Japanese developers, such as NEC, ASAHI and MATSUSHITA, are therefore pursuing milliampere and microampere applications, among others, as a battery replacement for computer memories and consumer electronics. Others use proton exchange membranes which are coated with a mixture of ruthenium oxide and carbon, for example, GINER INC., U.S.A. These double-layer capacitors are not suitable for high-power energy stores.

Double-layer capacitors for higher currents, which are developed in the U.S. for SDI-applications, are also based on carbon technology (MAXWELL).

An electrode described in U.S. Pat. No. 5,079,674 consists essentially of carbon and plastic. Carbon particles are mixed with metallic salts. By means of the addition of a lye, metal hydroxides are formed which adsorb on the carbon particles. By means of a fluoropolymer, such as PTFE, the particles are then bound to one another and are dried at 80° to 125° C.

These known metal hydroxides cannot be used in an acidic solution and chemically are not very stable and are therefore not practical for use in pulse-operated double-layer capacitors. Only a thermal after treatment above 300° C. will create stable metal oxides which can be used in an acidic and alkaline solution.

The compound of carbon, polymers and metal salts results in electrodes of a relatively high resistance. By means of these high-resistance electrodes, a pulse storage application subjected to high currents is not possible.

There is therefore needed an electrode, and a double-layer capacitor formed thereof, which have an improved conductivity, capacitance, energy density and power density.

These needs are met by an electrode with a long-time stability, a high surface capacitance and a low resistance for a double-layer capacitor. The electrode includes a chemically stable support material; an active layer of understoichiometric hydrated metal oxides; a base layer of precious metals on the support; and an electrically conductive oxidic intermediate layer between the support and the active layer.

Other objects, advantages and novel features of the present invention will become apparent from the following detailed description of the invention when considered in conjunction with the accompanying drawings.

DETAILED DESCRIPTION OF THE DRAWINGS

According to the present invention, the double-layer capacitor consisting of the electrode and the electrolyte is constructed as follows: the electrode consists of an active layer of a metal oxide powder on a chemically stable metal support, and the electrolyte is a diluted aqueous mineral acid or alkaline solution. In a preferred embodiment, the electrodes also contain bound chlorine.

The active layer of the electrode according to the present invention consists of chloride-containing, understoichiometric metal oxides in the form of $MO_{2-x}Cl_x \cdot yH_2O$. "M" are preferably the elements ruthenium, iridium, tantalum, titanium and platinum. The transition temperature of the preliminary stages of from 300° to 500° C. is decisive for the composition and the redox capacity of this active layer. The temperature should be in the phase transition of the chloridic preliminary stage to the hydrated oxide and can be determined from thermogravimetric curves.

By means of the teaching according to the present invention to separately produce chloride-containing understoichiometric metal oxide powders, and to apply them in a second step to the support, active layers of a high capacitance are obtained. Such layers have not been obtainable by means of the previously known processes. The morphology of the powders is adjusted by the addition of soluble salts during the manufacturing process.

The long-time stability of the electrode, i.e., lasting for several thousand hours, is achieved only by the fact that a base layer is entered between the active layer and the carrier.

Previous double-layer capacitors required a separator between the electrodes. The object of the invention describes a matrix-free construction of a double-layer capacitor.

The double-layer capacitor according to the present invention permits the storage of electrical energy on an extremely small space and permits the electric discharge with very high performances. Particularly with respect to the resistance and the current load, it has considerable better performance data than the previously known carbon and polymer technology.

The invention represents a system with a high pulse capacitance. It is a pulse energy storage device which is periodically charged and discharged and is capable of supplying high pulse currents. In contrast to the conventional electrolyte capacitor, the present invention is capable of functioning in the alternating-current operation.

Corresponding to the equation indicated above, the present invention has the following advantages:

1. High capacitance of the electrodes for storing as much electrical energy as possible.
2. Low resistance of the electrodes for keeping electrical losses low.
3. High capacitance and low resistance of the matrix/ electrolyte interface.
4. Combination of suitable electrodes, electrolytes, matrices, seals, end plates, conductances to functioning individual cells.
5. Combination of individual cells to form a double-layer capacitor of a low resistance and a high capacitance.

In order to achieve a high electrode capacitance, the active surface of the electrode must be enlarged. This is achieved by the application of high-surface coatings to chemically stable support materials.

In order to furnish high pulse currents, the electroactive coating must have a sufficient redox capacitance. This is achieved by the use of not completely oxidized metal oxides.

In the long-time operation under high currents, conventional electrodes exhibit a degradation which is the result of the forming of a less conductive intermediate layer between the metal carrier and the metal oxide coating. The electrodes according to the present invention therefore provide a special pretreatment step in which finely divided precious metal is applied to the etched support. These precious metal particles provide a conductive connection to the metal base and electrically short-circuit the possible lower-conducting intermediate layer.

A non-conductive porous spacer ("matrix") may be situated between the electrodes. However, the physical separation of the electrodes may also be achieved by recesses or guides of a surrounding housing. The advantage of the matrix is the fact that it absorbs the electrolyte and, even when the component is damaged, does not permit any liquid to flow to the outside.

The operability of the double-layer capacitor is achieved by pressing together electrodes and electrolyte-saturated matrices. The decomposition voltage of the electrolyte and the given operating voltage of the component determine the number of the series-connected electrode—matrix units (individual cells).

a) Electrode Material

Light-metal-supported metal oxide electrodes exhibit the best characteristics for the application with respect to resistance and capacitance. In this respect, the present invention is based on two concepts:

Acid technique: light metals, such as titanium, coated with metal oxides, in a sulfuric acid solution.

Alkaline technique: metallic carriers, such as nickel, coated with metal oxides, in an alkaline solution.

Electroactive coatings with chloride-containing understoichiometric ruthenium, iridium, tantalum, palladium titanium oxides and their mixtures exhibit the best results with respect to resistance and capacitance.

The prerequisite for a high specific capacitance is a large electrode surface. This is achieved by the manufacturing process of the electrodes. According to the specific application of the double-layer capacitor, the electrodes pass through several pretreatment steps which finally lead to the manufacturing of the metal-oxide-coated metal carrier electrodes according to the present invention.

Powder technique (sintering technique) for electrodes of a high capacitance (several farads per square centimeter) and a low resistance.

Separately produced metal oxide powders are applied to the carrier in an organic suspension and are dried.

Network technique for electrodes with a three-dimensional structure of a very high capacitance (several farads per square centimeter) and a low resistance. A close-meshed permeable metal network is applied to a plane metal support and is coated with high-surface metal oxides.

Film technology for electrodes of a high capacitance (several farads) and a low resistance. Separately produced powders are connected with the carrier by means of a conductive bonding agent suspension.

Combinations of network technique, powder technique and film technique.

The metallic carrier is cleaned, ground off and then etched. In the second step, the etched carrier is galvanically and/or chemically reductively coated with metallic precious metal particles (palladium, platinum, etc.). The metal nuclei significantly improve the resistance of the electrode in the long-time operation.

In the last step, the electrodes are heated while air is admitted. In the process, the coatings sinter onto the carrier in an adhesive manner.

A temperature in the range below 500° C. is important. The manufacturing does not result in an oxide electrode, as may be produced by sintering at a higher temperature. The electrode is free of carbon and contains bound chlorine.

The thus manufactured electrodes comprise four layers: 1) metallic carrier, 2) metallic intermediate layer, 3) metal oxide coating. By means of the drying operation, an additional mixed oxide layer will be formed between 2) and 3).

EXAMPLE 1

(Powder Method, Melting Process).

Ruthenium chloride (or mixtures of ruthenium chloride with palladium black, platinum black, platinum oxide, sodium hexahydrooxoplatinate, iridium oxide and/or tantalum chloride) and sodium nitrate are mixed in the melting pot and are suspended with a little diluted hydrochloric acid. The mixture is reacted with the admission of air. The thus produced powder is washed several times with water, is then dried and pulverized.

EXAMPLE 2

(Powder Method, Precipitation Process).

A concentrated alkalihydroxide solution is added to an aqueous ruthenium chloride solution (or a mixture of ruthenium chloride and hexachloroiridium acid and/or tantalum(V)-chloride) until the oxide hydrate is completely precipitated. Then filtering takes place and the filter cake is washed several times and dried.

The powder may (a) be used directly or (b) be thermally after treated at below 500° C. In this case, ruthenium oxide hydrate and tantalum oxide hydrate (a) may be precipitated separately and mixed before or after the subsequent drying or (b) may be precipitated and dried in one operation. The produced powder will be applied to the metal carrier, as described in Example 4.

EXAMPLE 3

(Modified Powder Method).

In separate operating steps, metal oxide powders produced according to Example 1 and/or 2 are mixed in variable proportions by weight and are jointly transformed to a mixed oxide powder. Metallic or oxidic platinum or palladium may also be added to the powder in order to improve the stability of the electrodes.

EXAMPLE 4

(Coating Technique).

In a suspension of high-boiling polyalcohols or nitrocellulose and several microliters hydrochloric acid, the powder is spread onto a pretreated metal carrier. The electrode will then be dried and sintered in the burning oven. Thick layers are obtained by a repeated spreading, spraying-on or printing-on of the coating suspension.

The electrodes for acidic and alkaline systems produced according to this process exhibit capacitances of up to 3 $F/cm^2$ or 100 F/g active mass.

EXAMPLE 5

(Pretreatment of the support).

Titanium is previously degreased, ground-off (until there are no more visible oxide residues), and is then etched in a boiling oxalic acid solution. Subsequently, the electrode which has a mat light-grey appearance is stored in diluted hydrochloric acid.

Nickel is slightly etched in diluted sulfuric acid.

EXAMPLE 6

(Precious Metal Base Layer).

For the manufacturing of electrodes with a long-time stability, a thin base layer of metallic palladium or platinum is applied galvanically and/or chemically. For electrodes with a good long-time behavior, a chemical base layer is applied first and a galvanic base layer is applied secondly.

Chemical palladium coating: The metal carrier is repeatedly wetted with an aqueous palladium chloride solution and then dried and is then brought in contact with a solution of reduction agents.

Galvanic palladium coating of the cathodically connected metal carrier of a solution of palladium chloride.

EXAMPLE 7

(Network Technique).

Capacitances of up to 4 farads/$cm^2$ electrode surface were achieved according to the following formula:

The carrier is a close-meshed nickel network which is welded onto a nickel sheet, or it is a porous nickel felt. This three-dimensional electrode structure ensures a high area-related surface and capacitance. The active layer is formed by powders according to Examples 1 to 3.

Figure 2:
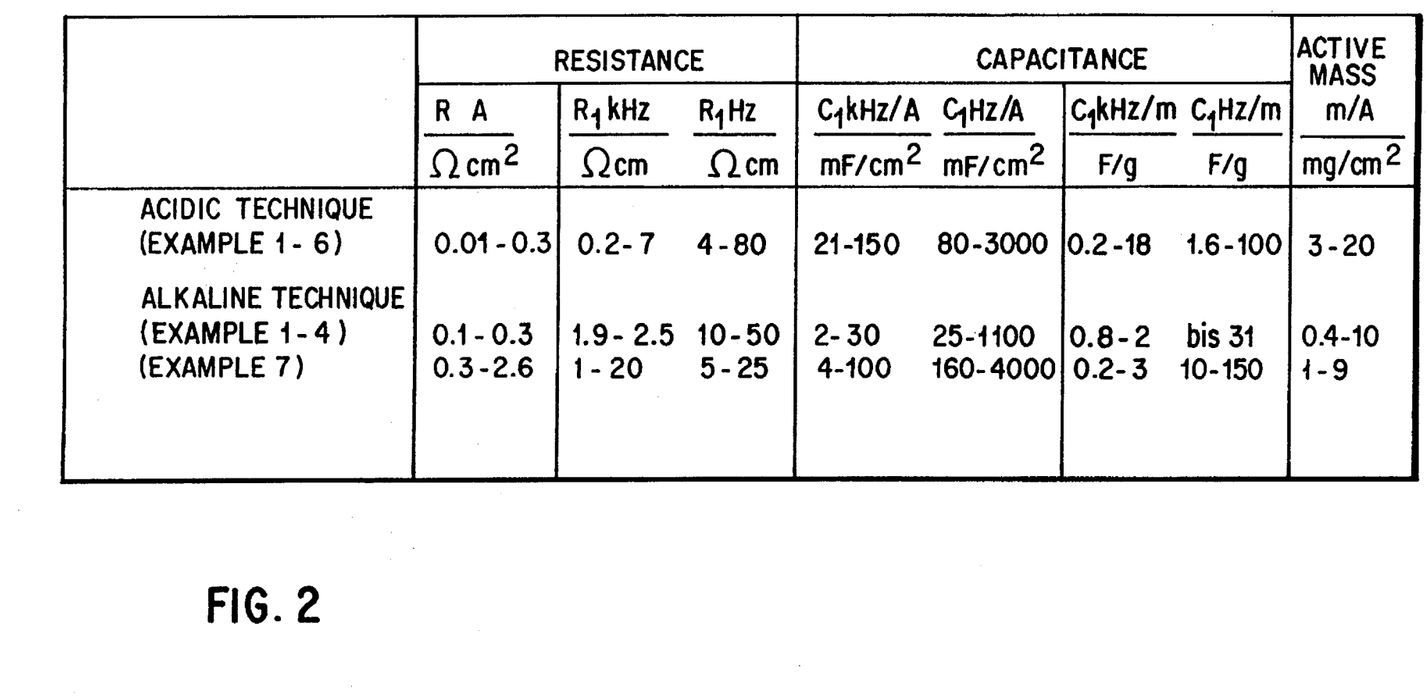
FIG. 2 is a table illustrating the characteristics of the electrodes according to examples 1–7 of the present invention.

FIG. 2 shows the characteristics of the electrodes according to Examples 1 to 7 in table form. The resistance and the capacitance were determined by impedance measurements on individual cells of the same ceramic matrix.

b) Electrolyte and Matrix

By the combination of two electrodes produced according to Examples 1 to 7 with an electrolyte-saturated matrix, individual cells are obtained. At the same time, the matrix is used as a separator. The used matrix material is of significant importance for the long-time stability of these cells. Special porous fiber ceramic wovens are used, such as zirconium dioxide taken up in chemically stable thermoplastics. In this case, the pore size must not be too large in order to avoid short circuits between mutually contacting metal oxide particles of opposite electrodes.

Inorganic acids and lyes with concentrations ranging in the maximum of the conductivity-concentration curve are used as electrolytes. The electrolyte may be concentrated by suitable redox active inorganic additions.

c) Cell Design

The constructional unit of the double-layer capacitor is created (i) by the electric series connection of individual cells, and (ii) by the series connection of bipolar electrode-matrix units.

The series design is of series-connected individual cells in a plastic or metal housing. The individual cells are produced separately and are subsequently electrically connected with one another.

The stack design:

Series connection of the electrode coated on two sides (=bipolar electrode), matrix, bipolar electrode, matrix, etc., to form a bipolar electrode stack.

The winding design for large-surface electrodes of which several, while being connected in series, may be combined in a housing. For a space-saving arrangement, the electrode-matrix units are also rolled.

EXAMPLE 8

(Series Design).

Figure 5:
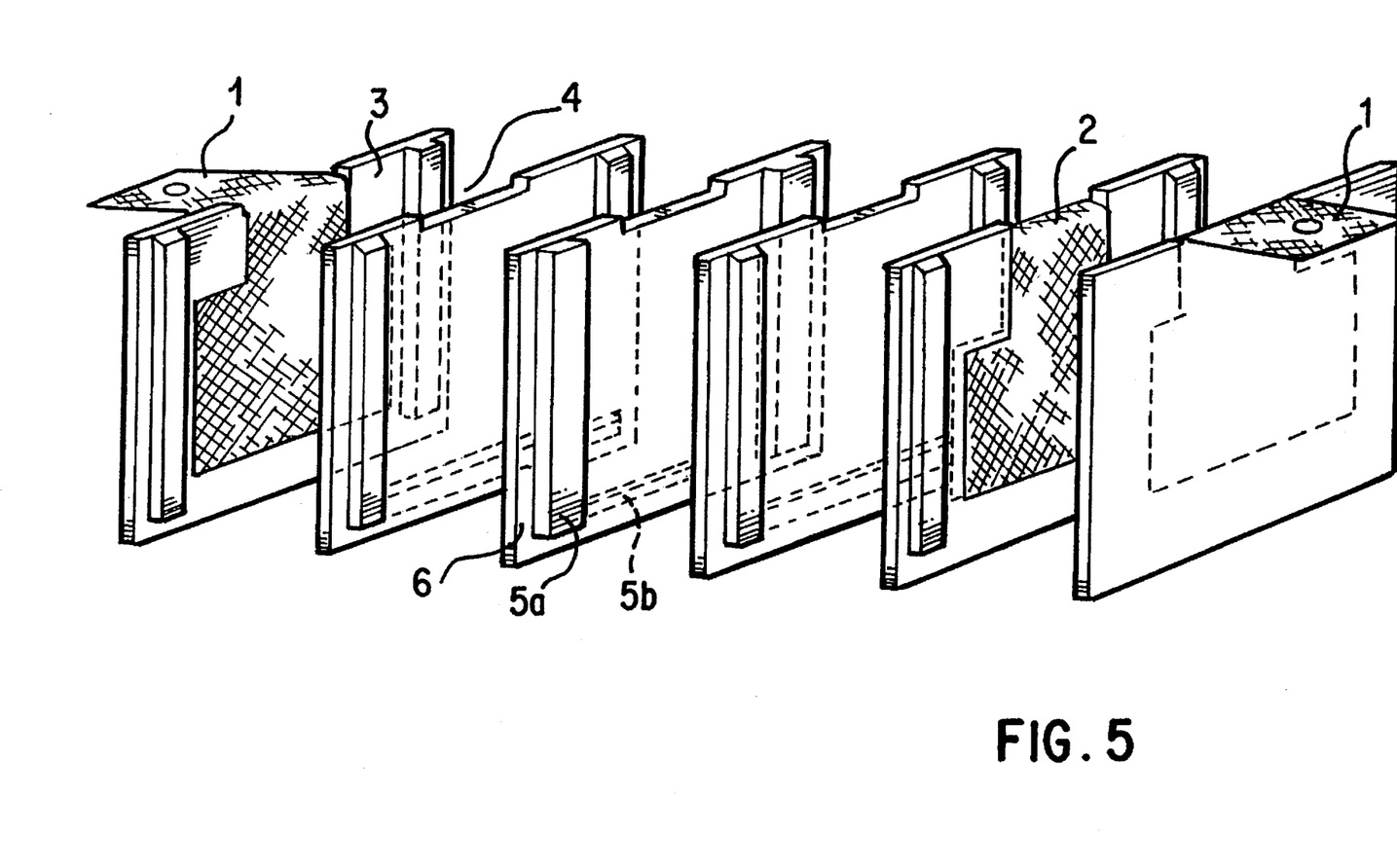
FIG. 5 is a schematic block diagram of a series design according to the present invention.

An embodiment is shown in FIG. 5. A housing part 3, which is constructed from chemically stable plastics, accommodates two electrodes 1, 2 and one electrolyte-saturated matrix (not shown) respectively. By means of the arrangement of several of such units behind one another, a double-layer capacitor is created which has several cells. From the outer end electrodes 1, electric feed lines extend out of the housing. Two successive inner bipolar electrodes 2 are respectively electrically connected with one another. The spaces 4 between the electrodes are filled with electrolyte. The housing parts 3 are joined to one another by a gluing of the webs 5a, 5b (5a rearward web, 5b forward web) along the grooves 6. The webs 5a, 5b define the spacing of two electrodes and the thickness of an individual cell. The individual plastic parts 3 form one half of the housing of an individual cell. The electrolyte is filled in through a recessed opening 4 which is formed after the two individual cell halves are joined together. The opening is closed off by means of a plastic stopper or a cap. The advantage of this embodiment is the refilling capacity with respect to the electrolyte.

EXAMPLE 9

(Stack Design).

Figure 3:
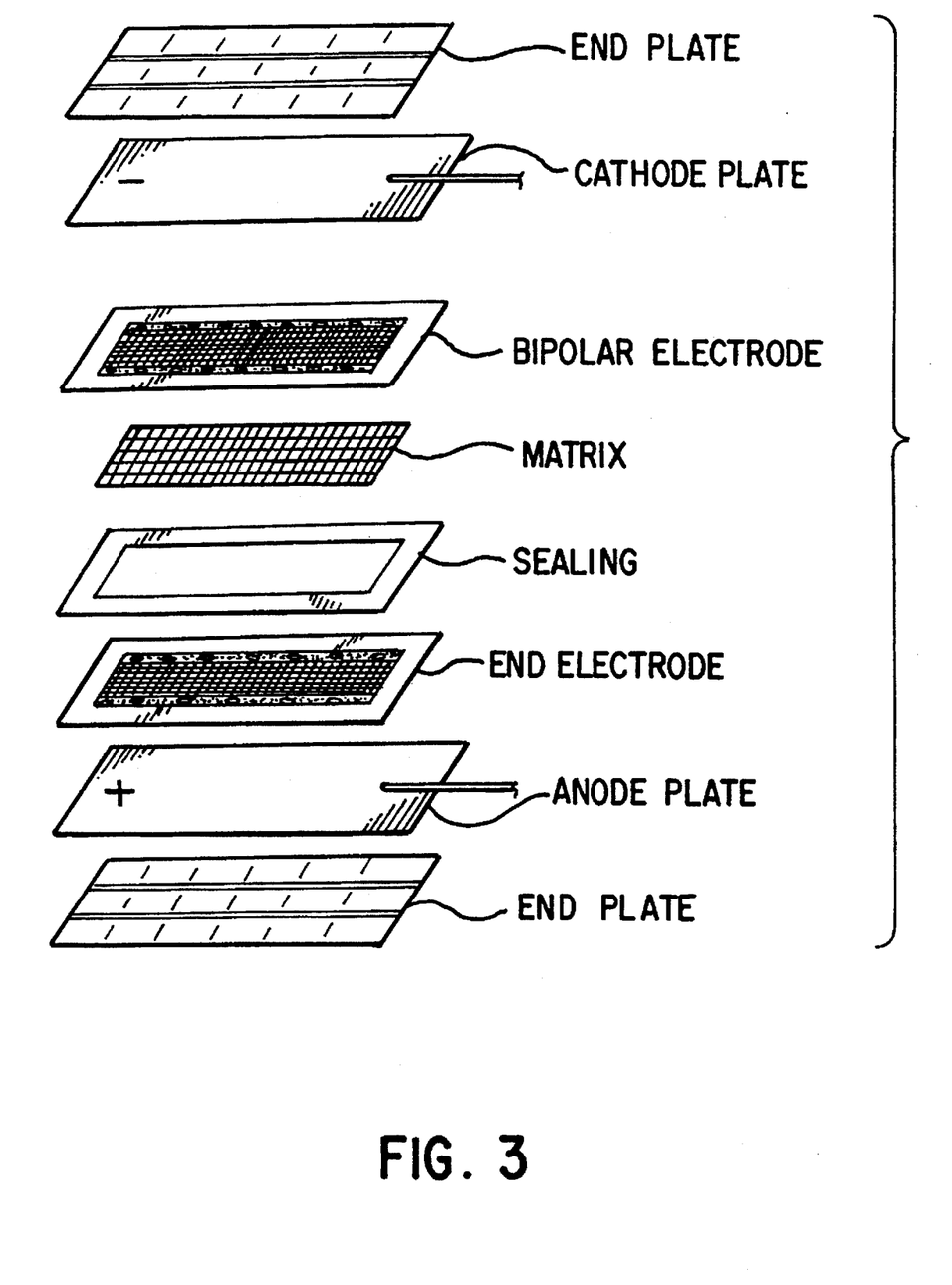
FIG. 3 is a schematic diagram of a stack design for a high-capacity storage device.

An embodiment is illustrated in FIG. 3. A number of electrodes which is specified by the operating voltage of the final component are coated on both sides (bipolar electrodes). Between two bipolar electrodes respectively, one electrolyte-saturated matrix is situated. Two additional electrodes, which are coated on one side, are connected by contact pressure with stable end plates (end electrodes). The individual electrolyte spaces between the electrodes are sealed off by seals (for example, polymer materials). As illustrated in FIG. 3, the current supply is carried out by the end plate. However, another possibility in this respect is a metallic stamp which is embedded in the end plate or an electric contact in the form of a cable or a metal strip mounted on the electrode.

The number of electrodes N is a function of the following formula:

Operating voltage=[2 end electrodes+(N−2) bipolar electrodes]* individual cell voltage.

The thickness of the stack is a function of the number of cells. The cell surface is arbitrary and determines the energy storage capacity of the system.

Figure 4:
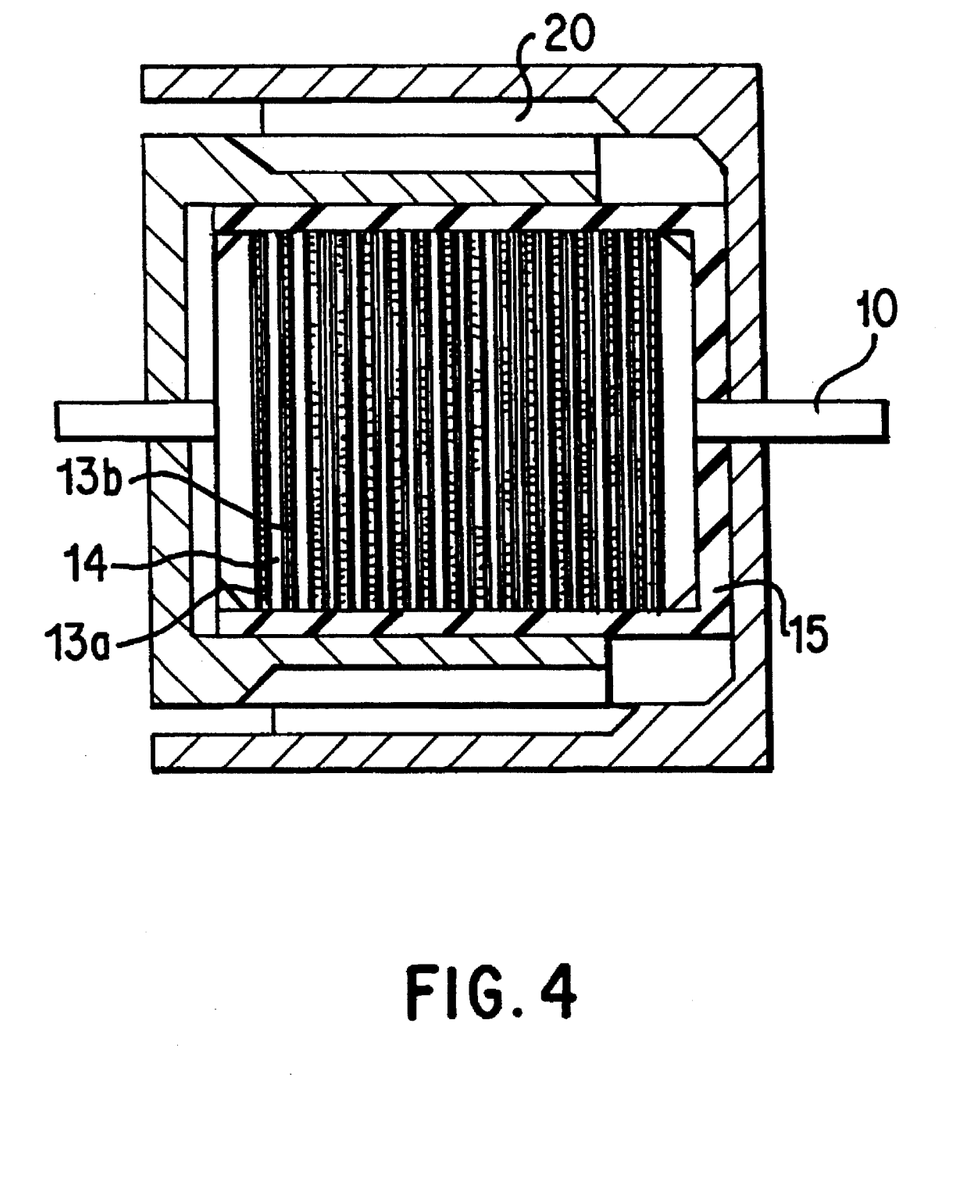
FIG. 4 illustrates an embodiment of the screw design according to the present invention.

FIG. 4 illustrates an embodiment of the stack design, the so-called screw design. Between two stamp-shaped end plates 10, the electrode stack is situated which consists of at least two electrodes 13a, 13b (13a end electrode, 13b bipolar electrode) and an interposed electrolyte spacer 14 with a liquid-saturated ceramic matrix. The stack which is created by placing the individual electrode-matrix units against one another, is held together by fixed screwed-together housing parts 20. An insulating layer 15 prevents electrical contact between the end plates. It is held together by fixed screwed-together end plates. The correct contact pressure is important during the assembly. Care must be taken that all cell components are disposed closely on one another and that no air bubbles are enclosed. The pressing must not destroy the porous surface of the coating. On the other hand, the sealing material must be pressed sufficiently, and the distance between the electrode plates must be kept small.

EXAMPLE 10

(Round-Cell Series Design).

Instead of by means of metallic end plates, the electrode-matrix stack according to Example 7 is installed in a metal housing that is similar to the one used as a "round cell" in the battery industry. Several round cells, which are connected with one another in an electrically conductive manner, form an arrangement which corresponds to the series design.

EXAMPLE 11

(Slide-in Design, No Matrix).

Figure 6:
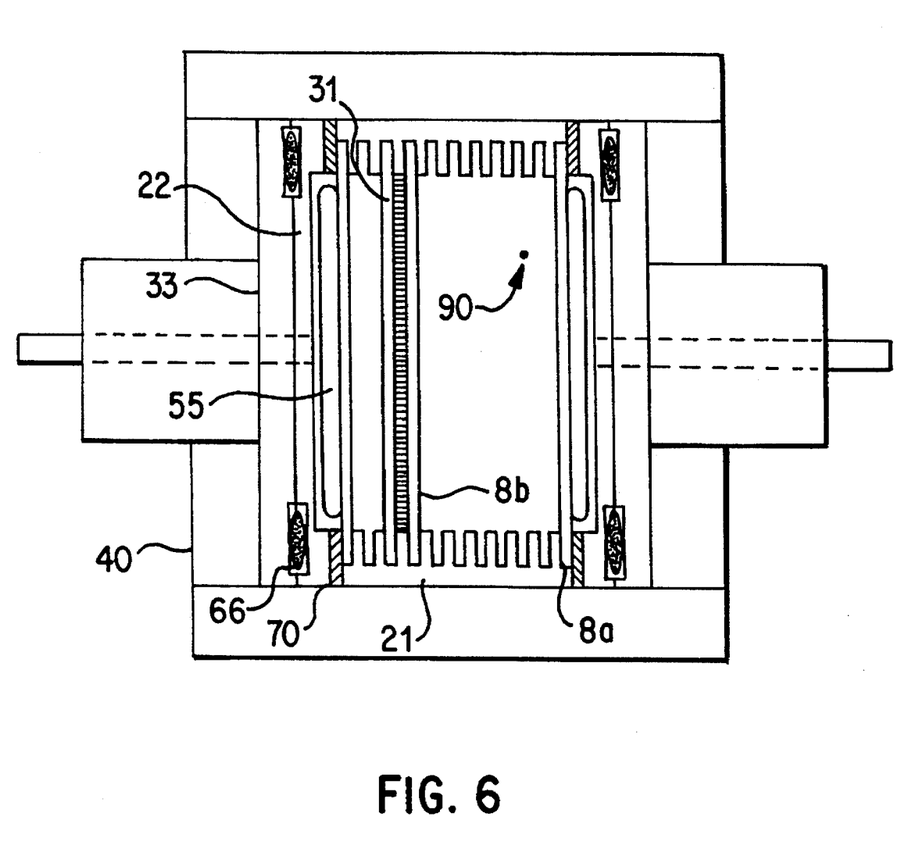
FIG. 6 is a schematic diagram of a slide-end design according to the present invention.

An embodiment is illustrated in FIG. 6. Instead of being separated by means of a matrix, the electrodes 8a, 8b are separated by means of a given holding device 21 with equidistant frame guides or spacers in a surrounding chemically stable plastic housing 40. The advantage of this matrix-free arrangement is the extremely low resistance of the thus produced double-layer capacitor and the refilling capacity. After the joining-together, the electrolyte spaces 31 are filled with electrolyte and the housing is closed off by means of a lid or by cast resin in one operation. The mechanical stability and tightness are achieved by means of two pressure stamps 33, pressure plates 22 and spring elements 66 embedded in the housing 40. The current tapping takes place by means of stamp-shaped metal end plates 55. A flat packing 70 is situated between the pressure plate 22 and the end electrode 8a. The housing bottom 90 consists of a plane plate and is connected in a moisture-tight manner with the distance holding device 31 and the surrounding housing 40.

Applications

This invention is particularly suitable for applications under high currents at low to medium voltages, among others, as well as buffer storage devices and voltage stabilizers under a high current load.

Figure 7:
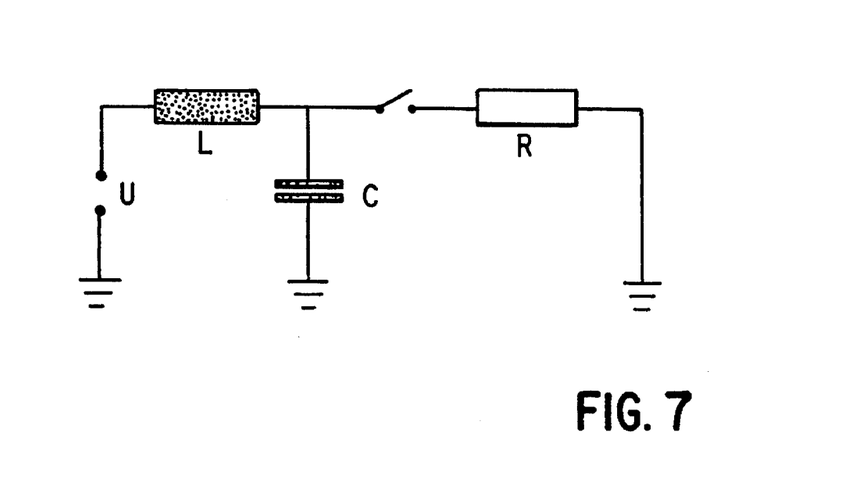
FIG. 7 is a circuit diagram of an energy supply system according to the present invention.

Together with a primary energy source, such as a battery, the double-layer capacitor forms an energy supply system as shown in FIG. 7. It comprises a voltage source U, the consuming device R and the double-layer capacitor C which is connected in parallel to the voltage source U. The coil L delays the charge current so that the capacitor C can be periodically discharged. The momentary peak energy demand of a consuming device R is met by means of the double-layer capacitor within microseconds, while the primary energy source supplies the base load. In this case, the electrochemical capacitor achieves two things: (a) the short-term availability of high power pulses, and (b) the securing of the primary energy supply in the case of short-term failures.

In the future, this principle will make it possible to design primary energy sources to be smaller and lighter. The reason is that the short-term power demand of the consuming device is met by the charged capacitor, while the base load is met by a battery or other primary energy source. This is significant for battery technology, space operations, microelectronics, automotive engineering and other technological fields of application.

Additional applications include the following: (a) power pulse storage (short-term availability of high power pulses for antennas, electric motors, electric machines, energy supply networks, communications systems, pulse lasers, load compensation in the case of electric drives, and others); (b) voltage stabilizer (for no-break power supplies); (c) energy buffers (bridging of energy supply in the case of power outages, securing of data in computer systems, securing the operation of electronic systems, protection of control electronics, short-term load compensation in the case of power generation); and (d) energy source for short time periods.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An electrode having a long-time stability, a high surface capacitance and a low resistance, for a double-layer capacitor, comprising
   a chemically stable support;
   an active layer of understoichiometric hydrated metal oxides;
   a base layer of precious metals arranged on said support; and
   an electrically conductive oxidic intermediate layer arranged between said support and said active layer.

2. An electrode according to claim 1, wherein said metal oxides are obtained in a powder form by precipitating using lyes made of chloride-containing metal salt solutions of the elements ruthenium, iridium, tantalum, titanium and platinum or other elements of Groups IVB to VIIIB of the Periodic System, and subsequent thermal transformation.

3. An electrode according to claim 1, wherein said metal oxides are obtained in powder form from chloride-containing metal salts of the elements ruthenium, iridium, tantalum, titanium and platinum or other elements of the groups IVB to VIIIB of the Periodic System with the addition of a water-soluble salt and by thermal decomposition, wherein the salt is then again dissolved out.

4. An electrode according to claim 1, wherein said support is made of one of networks, sheets and felts of one of nickel, titanium, valve metals and graphite.

5. An electrode according to claim 1, wherein said base layer is made of galvanically precipitated nuclei of one of palladium, platinum and other Group VIIIB precious metals.

6. An electrode according to claim 1, wherein said intermediate layer is formed by sintering metal oxide on said support at 300°–500° C., said intermediate layer being electrically short-circuited by the metal nuclei of the base layer.

7. An electrode according to claim 1, wherein said metal oxide is applied to the support combined with a conductive bonding agent.

8. A double-layer capacitor unit, comprising at least two electrodes, each of said electrodes including:
   a chemically stable support;
   an active layer of understoichiometric hydrated metal oxides;
   a base layer of precious metals arranged on said support; and
   an electrically conductive oxidic intermediate layer arranged between said support and said active layer.

9. A double-layer capacitor unit according to claim 8, wherein an electrolyte-saturated ceramic matrix on a base of zirconium dioxide is situated between the at least two electrodes.

10. A double-layer capacitor unit according to claim 8, wherein the at least two electrodes are fixed without any separator in a housing.

11. A double-layer capacitor unit according to claim 8, wherein two double-layer capacitor units are arranged in separate housing parts and are connected by a common bipolar electrode.

12. A double-layer capacitor unit according to claim 9, wherein two double-layer capacitor units are arranged in separate housing parts and are connected by a common bipolar electrode.

13. A double-layer capacitor unit according to claim 8, wherein two double-layer capacitor units are held together by housing halves which are screwed against one another.

14. A double-layer capacitor unit according to claim 9, wherein two double-layer capacitor units are held together by housing halves which are screwed against one another.

* * * * *